Patented Mar. 2, 1943

2,312,623

UNITED STATES PATENT OFFICE 2,312,623

TRACING PLASTIC

John C. Brooks, Longmeadow, and Elmer R. Derby, Springfield, Mass., assignors to Monsanto Chemical Company, St. Louis, Mo., a corporation of Delaware No Drawing. Application November 17, 1939, Serial No. 304,948

7 Claims. (Cl. 281—43)

The present invention relates to tracing materials such as tracing cloth and paper used by draftsmen and architects and more particularly to tracing material in either sheet or continuous film form that has markedly superior transparency and will take ink or pencil easily.

The tracing cloth used heretofore is subject to the well known disadvantage of not being sufficiently transparent to permit easy tracing of faint lines, particularly pencil or crayon lines. The cloth normally contains some amount of pigment or filler that intercepts the light rays and cuts down materially the light transmission efficiency. This necessitates tedious and prolonged work on the part of the draftsman and oftentimes causes imperfections in the finished tracing. The cloth is relatively expensive and therefore is not adaptable for wide common use as a tracing sheet by technicians or laymen. Also, erasure of ink lines or marks on tracing cloth, commonly required to correct mistakes caused by poor transparency or otherwise, is not simple. For ordinary tracing cloth the usual instructions are to use a sharp knife for scraping off the ink and then smooth and redress the scraped part with French chalk. This often results in injury to the tracing cloth.

Common tracing paper is somewhat less expensive than the tracing cloth described above but is otherwise subject to substantially the same objections as the tracing cloth. Furthermore, the tracing paper is substantially less durable and is subject to wrinkling or tearing, particularly if it becomes wet.

An object of this invention is to provide a tracing sheet and method of manufacture that overcomes the disadvantages of the materials used heretofore and which may be widely used at relatively low cost and with marked increase in efficiency.

In accordance with the present invention a new tracing medium has been obtained from a transparent plastic sheet or continuous film preferably possessing a fine matte surface having definite and distinct characteristics. After extensive research it has been discovered that the degree of refractivity or light transmission of the matte or roughened surface is largely determinative of the value of the normally transparent plastic sheets as a tracing medium. This may be termed, in the absence of pigments or other interfering media, the relative opacity or haziness of the product. This haziness of the plastic sheet or film has been conveniently obtained by means of the hazeometer described by Benjamin M. Axilrod and Gordon M. Kline, Journal of Research of the National Bureau of Standards, vol. 19, pages 370–372 (1937). Briefly, the apparatus and method of Axilrod and Kline follows: A 6-volt automobile-type bulb is mounted in front of a reflector. A cylindrical shield, blackened inside and with a circular aperture, B, in the center of the base, causes an approximately parallelled beam of light to be radiated towards a photoelectric cell. A blackened disk with a circular aperture, A, is mounted in front of the photoelectric cell. In the instrument as employed herein, the two openings, A and B, are each 1 inch in diameter and are spaced 18 inches apart. The photoelectric cell is of the Weston photronic type. The meter has an internal resistance of 50 ohms and a range of 100 microamperes.

To obtain a measure of the light transmission of the plastic, the light is adjusted in intensity so that a current of 100 microamperes is obtained from the photoelectric cell. A flat sample of the plastic is then placed in front of the cell at aperture A. Of the light incident on the sample, a fraction is transmitted undeviated, and a fraction is scattered by the surfaces and interior of the sample. The photoelectric cell receives the undeviated fraction of the light and that part of the scattered light which is not deflected at angles greater than about 90°. The light transmission of the plastic is defined as that fraction of the light received by the photoelectric cell through the unobstructed aperture, which continues to reach the sensitive element when the plastic is placed over the aperture A directly in front of the photoelectric cell.

To obtain a measure of the haziness, the flat plastic sheet is placed at aperture B, 18 inches distant from aperture A. The photoelectric cell still receives the undeviated fraction of the light, but collects only that small portion of the scattered light which is confined to the small solid angles subtended by aperture A at points in opening B. The difference between the photoelectric currents with the sample at A and B is a measure of the light scattered. Haziness is defined as the percentage of the total light transmitted at A, which is scattered when the sample is placed at B.

In accordance with the present invention, it has been found that transparent plastic, when free of fillers, pigments and other translucence producing materials, possessing a single matte surface, having a thickness of 3.5 to 6.0 mils, and having a haziness value, determined as defined above between substantially 88.5% and 95.0% when the polished side is toward the cell and between substantially 87.5% to 94.0% when the polished side is toward the light, forms a desirable tracing surface. In many cases it is preferred to employ transparent plastics, when free of fillers, pigments and other translucence producing materials, possessing a single matte surface, having a thickness of 3.5 to 6.0 mils, and having a haziness value of substantially 90.5% to 93.5% when the polished side is toward the cell and substantially 89.5% to 92.5% when the polished side is toward the test light. If desirable, fillers or pigments may be incorporated in the tracing sheet or film of this invention, although this is not necessary and generally undesirable. In that case the haziness values would, of course, change, but the haziness values due to the matte surface of the tracing plastic remains the same. The tracing sheet or film having a finish as described above will not only take ink and pencil markings readily from which blue prints can be made, but, due to the finish thereof the tracing is markedly water-resistant.

Among the tracing media, possessing this definite matte surface, which may be employed are those which are made from well-known transparent plastics such as those obtainable by polymerizing compounds containing the vinyl ($CH_2:CH$) or substituted vinyl radicals and defined generally herein as polyvinyl resins, for example polyvinyl halides, a co-polymer obtained from vinyl acetate and vinyl chloride, the polyvinyl esters, the vinylidene halide polymers, the polyvinyl acetals, the polyacrylates, polymethacrylates, co-polymers of vinyl chloride and acrylates, as for example co-polymer of vinyl chloride and methyl methacrylate, and polystyrenes; cellulose esters, for example cellulose acetate and cellulose acetate-butyrate; cellulose ethers, for example ethyl cellulose, and linear polyamide plastics, obtainable by heating an aliphatic diamine with a dibasic carboxylic acid under condensation polymerization conditions, as for example, polypentamethylene sebacamide, polyhexamethylene adipamide, polypentamethylene suberamide, polydecamethylene adipamide and the like.

Preferably, the tracing sheet or film where it is used as a substitute for tracing cloth, is made out of a polyvinyl type resin, and more particularly the polyvinyl acetal resins, wherein one side of the sheet or film has been treated to produce a matte surface that will permit the sheet to take ink and pencil easily and uniformly without any smearing or running. The present invention then further relates broadly to the use of tracing media made from plastics obtainable by polymerizing compounds containing the vinyl ($CH_2:CH$) or substituted vinyl radicals, as such products possess inherently most desirable properties as hereinafter shown. Preferably, the plastic sheet or film is free from fillers, pigments and the like, as they are not necessary, although, if desired, they may be employed. This improved tracing medium, although having a treated dull surface to facilitate tracing, has such high transparency through the body of the sheet or film that extremely fine pencil or ink lines, which could not be seen sufficiently to enable tracing through the ordinary tracing cloth or paper, can be easily and distinctly traced through the tracing medium defined above. In the preferred embodiment one side of the tracing sheet or film is left highly polished so that when a tracing made on the treated side of the sheet or film is viewed from the opposite side thereof, that is, through the thickness of the sheet or film, it can be easily seen and understood. This is in distinct contrast to tracings made upon the usual tracing cloth or paper since they cannot be seen distinctly when viewed through the thickness of the cloth or paper.

Moreover, tracing media in either sheet or continuous film form made of polyvinyl resins offer remarkable resistance to tearing or wrinkling and nevertheless are sufficiently flexible and supple to be creased and folded without cracking, breaking, or otherwise adversely affecting the sheet or the tracing thereon. Moreover, such materials exhibit low moisture absorption and low dimensional change. When corrections of the tracing are made on this sheet, it is not necessary to use a knife for scraping the ink from the sheet, but instead the correction can be made by a simple erasure with the ordinary ink eraser. This is made possible by the fact that the resin material of which the sheet or film is formed is slightly softer than the ink eraser and, therefore, the eraser will cut away a part of the surface to remove the ink. The abrasive particles in the eraser will roughen the surface of the sheet or film sufficiently to prepare it for reinking at the same time that the erasure is being made. No special treatment, such as redressing with French chalk is required. Because of the characteristics of the resin material, particularly the absence of any pigment or filler which would block off the passage of light rays, this tracing medium has very high light transmission efficiency.

The treated surface on the resin tracing medium not only serves to hold the ink but also renders the tracing more easily readable. If the ink lines were drawn on entirely transparent material, these lines would be partly obliterated by the background unless the tracing sheet or film were placed over a white surface during observation of the tracing. The treatment of one surface of the sheet or film in accordance with this invention prevents the background from showing through and in effect causes the ink or pencil lines to stand out so that they may be easily seen. Because of the properties of the polyvinyl resins, and the nature of the surface, the ink or pencil lines made on the treated surface will not blur or smear, that is, the surface is so treated that it will take ink readily but will not permit it to run.

In order to obtain the most desirable results from the use of sheets or continuous films of polyvinyl resin, as well as other transparent resins as a tracing medium, it is preferred that in the absence of fillers, pigments and other translucence producing materials, and in thicknesses of 3.5 to 6.0 mils, they have a haziness value as defined above between substantially 88.5% and 95.0% when the polished side is toward the cell and between substantially 87.5% and 94.0% when the polished side is toward the light. However, as stated hereinbefore, in its preferred embodiment, the plastic of the above characteristics has a haziness value of substantially 90.5% to 93.5% when the polished side is toward the cell and substantially 89.5% to 92.5% when the polished side is toward the light.

A decided advantage in the use of polyvinyl resins and in particular the polyvinyl acetal resins rests in their marked flexibility and resistance to creasing and tear where folding of the sheet is desired. Pyroxylin plastic commonly called Celluloid has been proposed for use as a tracing medium, but, even when it has the matte surface comprising one embodiment of the present invention, it is markedly inferior to similar tracing media made from polyvinyl resins, for example, polyvinyl acetal resins, and is capable of only limited usage. It, of necessity by virtue of its inherent nature, is hard, dense, relatively inflexible and less moisture resistant.

For purposes of illustration only and as examples of polyvinyl acetal resins, we may employ those materials described in U. S. patent to Morrison et al. Reissue No. 20,430, dated June 29, 1937, and in French Patent No. 793,175, delivered November 7, 1935, and published January 18, 1936. These acetal resins vary in the proportion of the degree of hydrolysis of the ester and the degree of combination of the aldehyde. A very satisfactory polyvinyl acetal resin for use as a tracing medium according to the present invention and known as "Formvar" may be made by hydrolyzing a polyvinyl acetate and reacting with formaldehyde so that the final resin may be considered to be made substantially of 82% acetal, 8% hydroxyl groups, calculated as polyvinyl alcohol, and 10% acetate by weight. The resin so obtained has been found to give a desirable plastic for use as a tracing medium. If desirable, suitable plasticizers may be employed.

Another very desirable resin for use as a tracing medium and known as "Butvar" may be made by hydrolyzing a polyvinyl acetate and reacting with butyraldehyde so that the final resin may be considered to be made substantially of 2% or less of acetate, 16 to 20% hydroxyl groups, calculated as polyvinyl alcohol and the balance acetal. This resin may be suitably plasticized and is an excellent plastic for use as a tracing medium. As a specific example 100 parts by weight of the above resin was plasticized with 2 parts by weight of dibutyl phthalate. Polyvinyl acetals made with other aldehydes, as for example acetaldehyde, propionaldehyde, valeraldehyde and the like or mixtures of aldehydes may be used according to the present invention.

To prepare the plastic sheet or continuous film material from the polyvinyl acetal plastic the plastic may be mixed and then extruded through an orifice formed between a die blade and die roll as described in U. S. patent to Esselen et al. No. 2,148,062, dated February 21, 1939, and wherein the die roll is suitably embossed so that one side of the sheet has a matte surface and the other side is smooth. If desired, other methods of treating the sheet may be employed in order to obtain the desired matte surface. Thus, the sheet may be extruded or cast so as to produce a polished surface on both sides of the sheet, after which the sheet is embossed by pressing between metal rolls, one of which has a highly polished surface and the other having a matte finished surface. Other suitable methods for obtaining the desired surface may, of course, be employed, such as by treatment with chemicals. For example, the surface of the continuous plastic film may be treated for short periods of time with solvents for the plastic material under the conditions of use. Thus, the wet plastic may be given a short treatment with a dilute alcohol at a temperature of about 170° F. or the fully seasoned continuous plastic film may be treated with a more active solvent at a lower temperature, or a combination of the two may be employed.

The following are given as specific embodiments of the present invention showing sheets or films of unfilled and unpigmented plastic having on one side a matte surface and on the other a smooth surface, and which possess the most desirable tracing characteristics. They are to be understood, however, as examples and in no sense limitative of the scope of the present invention, as other transparent plastics having the same light transmission or haziness values exhibit the same properties.

TABLE

*Light transmission of plastic tracing sheet*

| Sample | Thickness of sample, mils | Percent light transmission | | | | Haziness value | |
|---|---|---|---|---|---|---|---|
| | | Sample at cell | | Sample 18" from cell | | Polished side toward cell $\left(\frac{A'-B'}{A'}100\right)$ | Polished side toward light $\left(\frac{A^2-B^2}{A^2}100\right)$ |
| | | Polished side toward cell A' | Polished side toward light A² | Polished side toward cell B' | Polished side toward light B² | | |
| "Formvar" | 4.3 | 86.1 | 74.1 | 6.1 | 6.2 | 92.9 | 91.8 |
| "Butvar" plastic | 4.4 | 86.2 | 73.4 | 6.0 | 6.0 | 93.0 | 91.7 |
| Cellulose acetate plastic | 3.5 | 88.4 | 75.8 | 6.8 | 7.0 | 92.2 | 90.9 |

The cellulose acetate plastic employed above was composed of 100 parts by weight of cellulose acetate, 15 parts by weight of diethyl phthalate and 15 parts by weight of di-(methoxy-ethyl) phthalate.

As hereinbefore set forth, tests carried out in the manner described above showed that transparent plastics free of fillers, pigments and other translucence producing materials, having a matte surface and a haziness value between 88.5% and 95.0% when the polished side is toward the cell and between 87.5% and 94.0% when the polished side is toward the light may be advantageously employed. A transparent plastic of this same class and thickness having a haziness value less than these has too fine an etched or matte surface for exhibiting the best tracing properties and a transparent plastic of this same class and thickness having a haziness value greater than these has too coarse an etched or matte surface for exhibiting the best tracing properties.

This invention is limited solely by the claims appended hereto.

What is claimed is:

1. A flexible transparent article in sheet form comprising essentially a polyvinyl acetal resin capable of use as a tracing medium having substantially no filler or pigment and having a substantially uniformly imprinted matte surface on at least one side thereof and a polished surface on the other and having a haziness value as determined by the Axilrod-Kline hazeometer, which has a photoelectrical cell opposite a light source, when employed in thicknesses of 3.5 to 6.0 mils, of substantially 90.5% to 93.5% when the polished side is toward the photoelectric cell and substantially 89.5% to 92.5% when the polished side is toward the light source.

2. A flexible transparent plastic article in sheet form comprising essentially a polyvinyl acetal resin made with butyraldehyde capable of use as a tracing medium having substantially no filler or pigment, having a substantially uniformly imprinted matte surface on at least one side thereof and a polished surface on the other side and having a haziness value as determined by the Axilrod-Kline hazeometer, which has a photoelectrical cell opposite a light source, when employed in thicknesses of 3.5 to 6.0 mils, of substantially 90.5% to 93.5% when the polished side is toward the photoelectric cell and substantially 89.5% to 92.5% when the polished side is toward the light source.

3. A flexible transparent plastic article in sheet form comprising essentially a vinyl chloride copolymer capable of use as a tracing medium, having a substantially uniformly imprinted matte surface on at least one side thereof and a polished surface on the other side and having a haziness value as determined by the Axilrod-Kline hazeometer, which has a photoelectrical cell opposite a light source, when employed in thicknesses of 3.5 to 6.0 mils, in the absence of fillers, pigments, or other translucence producing materials, of substantially 90.5% to 93.5% when the polished side is toward the photoelectric cell and substantially 89.5% to 92.5% when the polished side is toward the light source.

4. A flexible transparent plastic article in sheet form comprising essentially a vinyl chloride-vinyl ester copolymer capable of use as a tracing medium having substantially no filler or pigment, having substantially uniformly imprinted matte surface on at least one side thereof and a polished surface on the other side and having a haziness value as determined by the Axilrod-Kline hazeometer, which has a photoelectrical cell opposite a light source, when employed in thicknesses of 3.5 to 6.0 mils, of substantially 90.5% to 93.5% when the polished side is toward the photoelectric cell and substantially 89.5% to 92.5% when the polished side is toward the light source.

5. A flexible transparent plastic article in sheet form comprising essentially vinyl chloride-vinyl acetate copolymer capable of use as a tracing medium having a substantially uniformly imprinted matte surface on at least one side thereof and a polished surface on the other side and having a haziness value as determined by the Axilrod-Kline hazeometer, which has a photoelectrical cell opposite a light source, when employed in thicknesses of 3.5 to 6.0 mils, in the absence of fillers, pigments or other translucence producing materials of substantially 90.5% to 93.5% when the polished side is toward the photoelectric cell and substantially 89.5% to 92.5% when the polished side is toward the light source.

6. A sheet of transparent polyvinyl resin plastic material having on a surface thereof a substantially uniform matte finish, said matte finish being characterized by imparting to a sheet of said transparent plastic material of from about 3.5 to about 6.0 mils in thickness having said finish on one surface thereof and a polish on the other surface a haziness value as determined by the Axilrod-Kline hazeometer, which has a photoelectric cell opposite a light source, in the absence of fillers, pigments or other translucence producing materials in said transparent plastic material, of between substantially 88.5% and 95.0% when measured with the matte finish toward the light source and between substantially 87.5% and 94.0% when measured with the matte finish toward the photoelectric cell.

7. A sheet of transparent polyvinyl resin plastic material having on a surface thereof a substantially uniform matte finish, said matte finish being characterized by imparting to a sheet of said transparent plastic material of from about 3.5 to about 6.0 mils in thickness having said finish on one surface thereof and a polish on the other surface a haziness value as determined by the Axilrod-Kline hazeometer, which has a photoelectric cell opposite a light source, in the absence of fillers, pigments or other translucence producing material in said transparent plastic material, of between substantially 90.5% and 93.5% when measured with the matte finish toward the light source and between substantially 89.5% and 92.5% when measured with the matte finish toward the photoelectric cell.

JOHN C. BROOKS.
ELMER R. DERBY.